United States Patent
Jo et al.

(10) Patent No.: US 11,603,919 B2
(45) Date of Patent: Mar. 14, 2023

(54) METHOD OF CONTROLLING EOP OF HYBRID VEHICLE

(71) Applicants: Hyundai Motor Company, Seoul (KR); Kia Corporation, Seoul (KR)

(72) Inventors: Se Hwan Jo, Bucheon-Si (KR); Seong Min Son, Pohang-Si (KR); Kyung Moo Lee, Yongin-Si (KR); Bong Uk Bae, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 91 days.

(21) Appl. No.: 17/408,223

(22) Filed: Aug. 20, 2021

(65) Prior Publication Data

US 2022/0268352 A1 Aug. 25, 2022

(30) Foreign Application Priority Data

Feb. 23, 2021 (KR) .................. 10-2021-0024050

(51) Int. Cl.
*F16H 57/04* (2010.01)
*F16H 61/00* (2006.01)

(52) U.S. Cl.
CPC ..... *F16H 57/0435* (2013.01); *F16H 57/0436* (2013.01); *F16H 57/0446* (2013.01); *F16H 61/0025* (2013.01)

(58) Field of Classification Search
CPC ............ F16H 57/0435; F16H 57/0436; F16H 57/0446; F16H 61/0025
See application file for complete search history.

(56) References Cited

U.S. PATENT DOCUMENTS

| 8,747,074 B2* | 6/2014 | Jeong ................. F04B 35/04 417/16 |
| 10,502,314 B2* | 12/2019 | Mouri ................ F16H 59/72 |
| 11,506,275 B2* | 11/2022 | Nakasone ......... F16H 57/0435 |
| 2016/0003346 A1* | 1/2016 | Lee .................. F16H 57/0447 701/22 |

FOREIGN PATENT DOCUMENTS

KR 10-2053434 12/2019

* cited by examiner

*Primary Examiner* — Huan Le
(74) *Attorney, Agent, or Firm* — Morgan, Lewis & Bockius LLP

(57) ABSTRACT

A method of controlling an EOP of a hybrid vehicle may include controlling the EOP in a predetermined high-speed mode when the vehicle is started; controlling the EOP in a predetermined middle-speed mode in which the EOP is driven at revolutions per minute (RPM) lower than RPM of the high-speed mode when the high-speed mode is terminated; and controlling the EOP in a predetermined low-speed mode in which the EOP is driven at RPM lower than the RPM of the middle-speed mode when the vehicle is stopped.

19 Claims, 9 Drawing Sheets

METHOD OF CONTROLLING EOP OF HYBRID VEHICLE

CROSS REFERENCE TO RELATED APPLICATION

The present application claims priority to Korean Patent Application No. 10-2021-0024050, filed Feb. 23, 2021, the entire contents of which is incorporated herein for all purposes by this reference.

BACKGROUND OF THE INVENTION

Field of the Invention

The present invention relates to a method of controlling an electric oil pump (EOP) provided to supply oil pressure required for a transmission of a hybrid vehicle.

Description of Related Art

Since constant operating of an engine of a hybrid vehicle may not be guaranteed at all times due to an idle stop, etc., there are many cases in that the hybrid vehicle is provided with an electric oil pump (EOP) that generates oil pressure to operate, lubricate, and cool a transmission independently from the operating of the engine. In addition, recently, since mechanical oil pumps are completely excluded and only electric oil pumps are provided for the vehicles, the present invention relates to only the vehicle provided with the EOP.

The oil pressure supplied from the EOP is used for lubricating and cooling the transmission, controlling the shifting of the transmission, and controlling an engine clutch that intermittently connects the engine and the transmission to each other.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling an EOP of a hybrid vehicle, wherein the drive loss of the EOP is minimized during the EOP driving by considering the driving condition of the vehicle and the input torque of a transmission and optimizing the oil pressure and flow rate required by the transmission, so that the fuel economy of the vehicle is eventually improved, thereby further improving the production quality of the vehicle.

According to various exemplary embodiments of the present invention for achieving the objective as described above, there is provided a method of controlling an EOP of a hybrid vehicle, the method including: controlling the EOP in a predetermined high-speed mode when the vehicle is started; controlling the EOP in a predetermined middle-speed mode in which the EOP is driven at revolutions per minute (RPM) lower than RPM of the high-speed mode when the high-speed mode is terminated; and controlling the EOP in a predetermined low-speed mode in which the EOP is driven at RPM lower than the RPM of the middle-speed mode when the vehicle is stopped, wherein the high-speed mode, the middle-speed mode, and the low-speed mode commonly control the RPM of the EOP in consideration of target line pressure and ATF oil temperature of a transmission.

The EOP may be controlled in the high-speed mode, when the vehicle starts while being controlled in the low-speed mode.

The high-speed mode may be terminated after being performed for a predetermined reference time.

In the high-speed mode, the EOP may be driven by use of The H-point RPM selected depending on current target line pressure and ATF temperature from a high-speed map including The H-point RPM according to line pressure and ATF temperature, and The H-point RPM may include a minimum RPM of the EOP providing a maximum value of a flow rate generated when forming corresponding line pressure for combinations of each of the line pressure and the ATF temperature.

In the low-speed mode, the EOP may be driven by use of the L-point RPM selected depending on current target line pressure and ATF temperature from a low-speed map including the L-point RPM according to line pressure and ATF temperature, and The H-point RPM may include a minimum RPM of the EOP providing corresponding line pressure for combinations of each of the line pressure and the ATF temperature.

In the middle-speed mode, the EOP may be driven by use of the M-point RPM selected depending on current target line pressure and ATF temperature from a middle-speed map including the M-point RPM according to line pressure and ATF temperature, and among the RPM from the L-point RPM which is a minimum RPM of the EOP for forming corresponding line pressure for combinations of each of the line pressure and ATF temperature to the H-point RPM which is the minimum RPM of the EOP for providing a maximum value of a flow rate generated when forming the corresponding line pressure, the M-point RPM may be determined such that the higher the line pressure, the closer the H-point RPM, and may be determined such that the lower the line pressure, the closer the L-point RPM.

The M-point RPM may be the RPM determined by equally applying a % ratio of the current target line pressure to the maximum line pressure of the transmission to a section between the L-point RPM and the H-point RPM.

The target line pressure may be determined by an input torque of the transmission.

In a case of controlling the EOP in the high-speed mode by starting the vehicle, the target line pressure may be controlled to be minimum line pressure.

In various exemplary embodiments of the present invention, the drive loss of the EOP is minimized during the EOP driving by considering the driving condition of the vehicle and the input torque of the transmission and optimizing the oil pressure and flow rate required by the transmission, and the drag of rotating portions such as a clutch of the transmission is minimized, so that the fuel economy of the vehicle is improved, further improving the product quality of the vehicle.

Furthermore, in various exemplary embodiments of the present invention, the vehicle is controlled in a high-speed mode by setting target line pressure as the minimum line pressure when the vehicle starts, to promote the rapid filling of a flow path, shorten the driving time of the EOP, and reduce loss of the drive power, improving the fuel economy of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
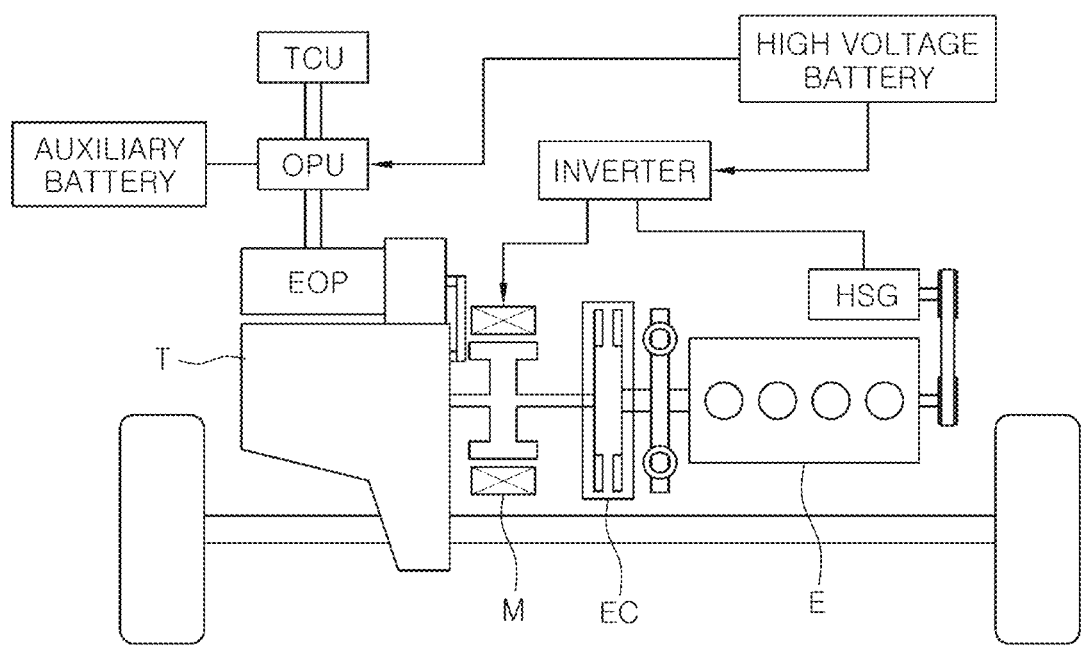
FIG. 1 is a view showing a configuration of a hybrid vehicle to which various exemplary embodiments of the present invention may be applied.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Specific structural and functional descriptions of the exemplary embodiments of the present invention disclosed herein are only for illustrative purposes of the exemplary embodiments of the present invention. The present invention may be embodied in various forms. Therefore, the exemplary embodiments of the present invention should not be construed as limiting the present invention.

Since the exemplary embodiments of the present invention may be variously modified in various forms, specific embodiments will be illustrated in the drawings and described in detail in the specification or application of the present invention. However, this is not intended to limit the exemplary embodiments in accordance with the concept of the present invention to a particular disclosed form. On the contrary, the present invention is to be understood to include all various alternatives, equivalents, and substitutes that may be included within the spirit and scope of the present invention.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "coupled" to another element, it may be directly coupled or connected to the other element or intervening elements may be present. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for describing various exemplary embodiments only and is not intended to be limiting. As used herein, the singular forms are intended to include the plural forms as well, unless the context clearly indicates otherwise. It will be further understood that the terms "comprise", "include", "have", etc when used in the present specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Hereinafter, various exemplary embodiments of the present invention will be described in detail with reference to the accompanying drawings. Throughout the drawings, the same reference numerals will refer to the same or like parts.

FIG. 1 is a view showing a configuration of a hybrid vehicle to which various exemplary embodiments of the present invention may be applied, wherein the power of an engine E is configured to be transmitted to a transmission T through an engine clutch EC, and an input shaft of the transmission is provided with a motor M to form a hybrid powertrain.

The transmission T is provided with an electric oil pump (EOP) that generates an oil flow to be used for control of both the transmission T and an engine clutch EC, by receiving the control of an oil pump control unit (OPU).

For reference, the engine is provided with a hybrid starter and generator (HSG) to be able to start the engine and perform the power generation, and the motor M is configured to be controlled by an inverter.

Since the transmission is controlled by the transmission control unit (TCU), and the OPU is also controlled by the TCU, the present invention to be described below is substantially performed by a controller such as the TCU, and the OPU may serve a role of directly driving the EOP by receiving a command from the TCU.

Figure 2:
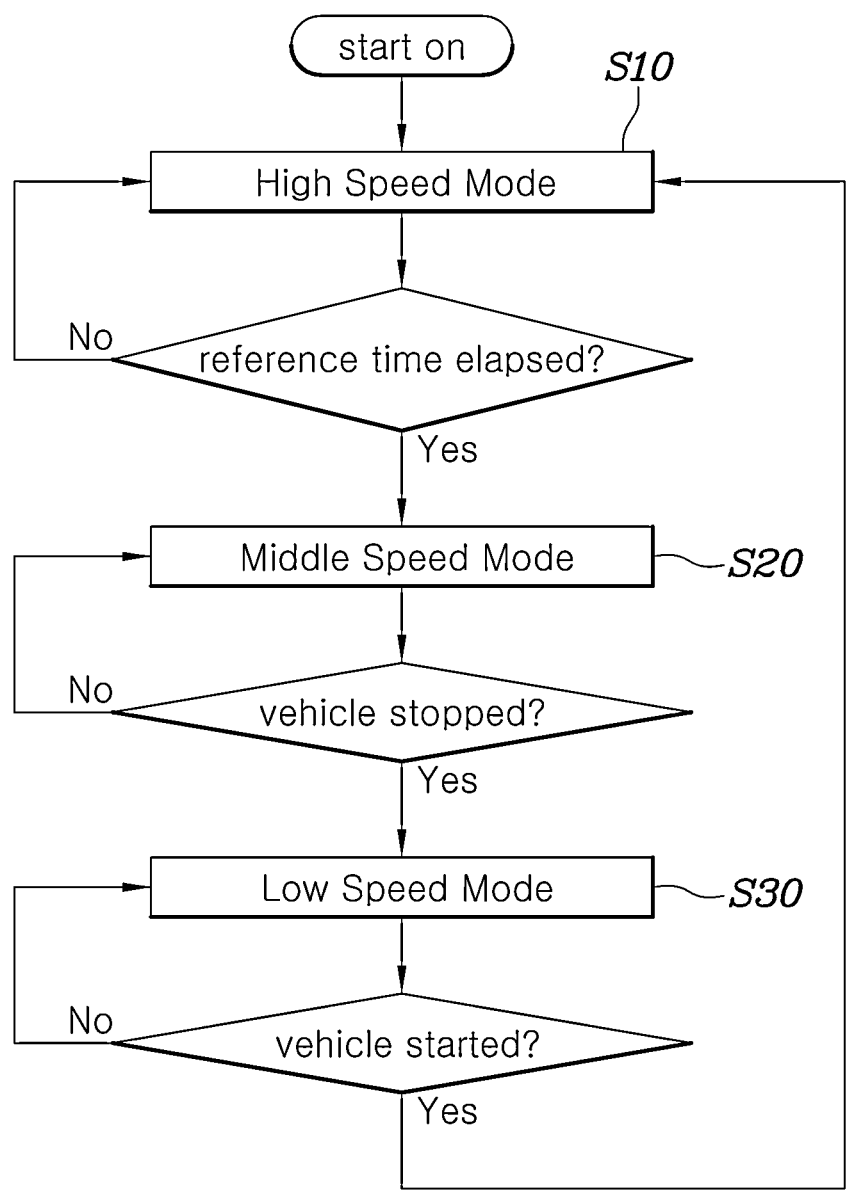
FIG. 2 is a flowchart showing an exemplary embodiment of a method of controlling an EOP of the hybrid vehicle according to various exemplary embodiments of the present invention.

Referring to FIG. 2, the exemplary embodiment of the method of controlling the EOP of the hybrid vehicle according to various exemplary embodiments of the present invention is include: a step S10 of controlling the EOP with a predetermined high-speed mode when the vehicle is started; a step S20 of controlling the EOP with a predetermined middle-speed mode in which the EOP is driven with the RPM lower than the RPM of the high-speed mode when the high-speed mode is stopped; and a step S30 of controlling the EOP with a predetermined low-speed mode in which the EOP is driven with the RPM lower than the RPM of the middle-speed mode when the vehicle is stopped.

The above steps may be performed by the controller such as the TCU, as described above.

Here, in the high-speed mode, the middle-speed mode, and the low-speed mode, the RPM of the EOP is commonly controlled in consideration with the target line pressure of the transmission and the oil temperature of automatic transmission fluid (ATF).

Furthermore, when the vehicle starts while controlling the EOP in the low-speed mode, the EOP is controlled in the high-speed mode, and the high-speed mode is performed for a predetermined reference time and then stopped.

In other words, when a driver starts a vehicle to drive the vehicle, or when the vehicle is started while the vehicle was stopped and controlled in low speed mode, the controller controls the EOP in the high-speed mode, so that the flow path of the transmission is rapidly filled with ATF to enable the vehicle to start immediately, preventing the deterioration of durability of lubrication-required portions while ensuring excellent vehicle responsiveness.

Therefore, according to the intent of using the high-speed mode as described above, it is appropriate that the reference time is set to a time sufficient to be ready to start operation of the transmission, such as filling the flow path, and the reference time may be set to a predetermined time period, or may be set longer as the temperature of the ATF is lowered.

The high-speed mode is a mode for driving the EOP by use of the RPM of a point H selected depending on current target line pressure and temperature of the ATF from the high-speed map including the RPM of the point H according to the line pressure and the temperature of the ATF.

The H-point RPM includes the minimum RPM of the EOP, wherein the maximum flow rate is generated when forming corresponding line pressure for combinations of each of line pressure and ATF temperature.

Figure 3:
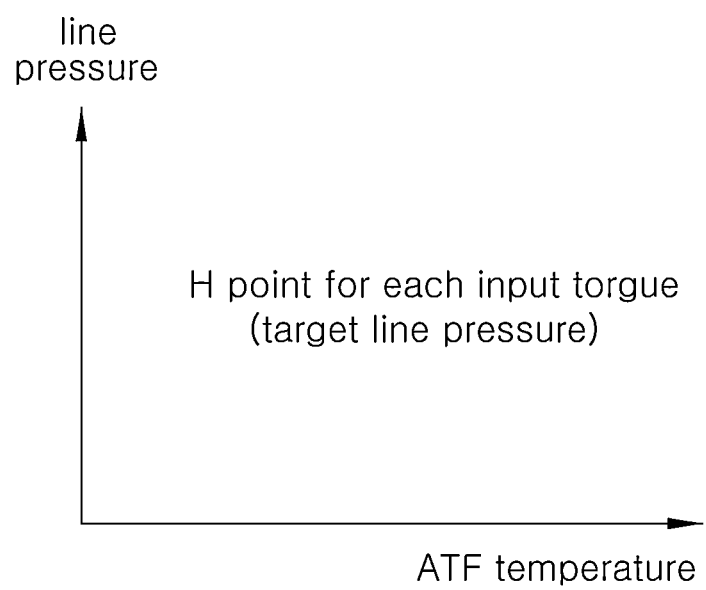
FIG. 3 is a conceptual view showing a high-speed map according to various exemplary embodiments of the present invention.

For example, the high-speed map includes the H-point RPM depending on the temperature of the ATF and the line pressure as shown in FIG. 3, so that the controller may easily select the H-point RPM corresponding to the current target line pressure and ATF temperature.

Figure 4:
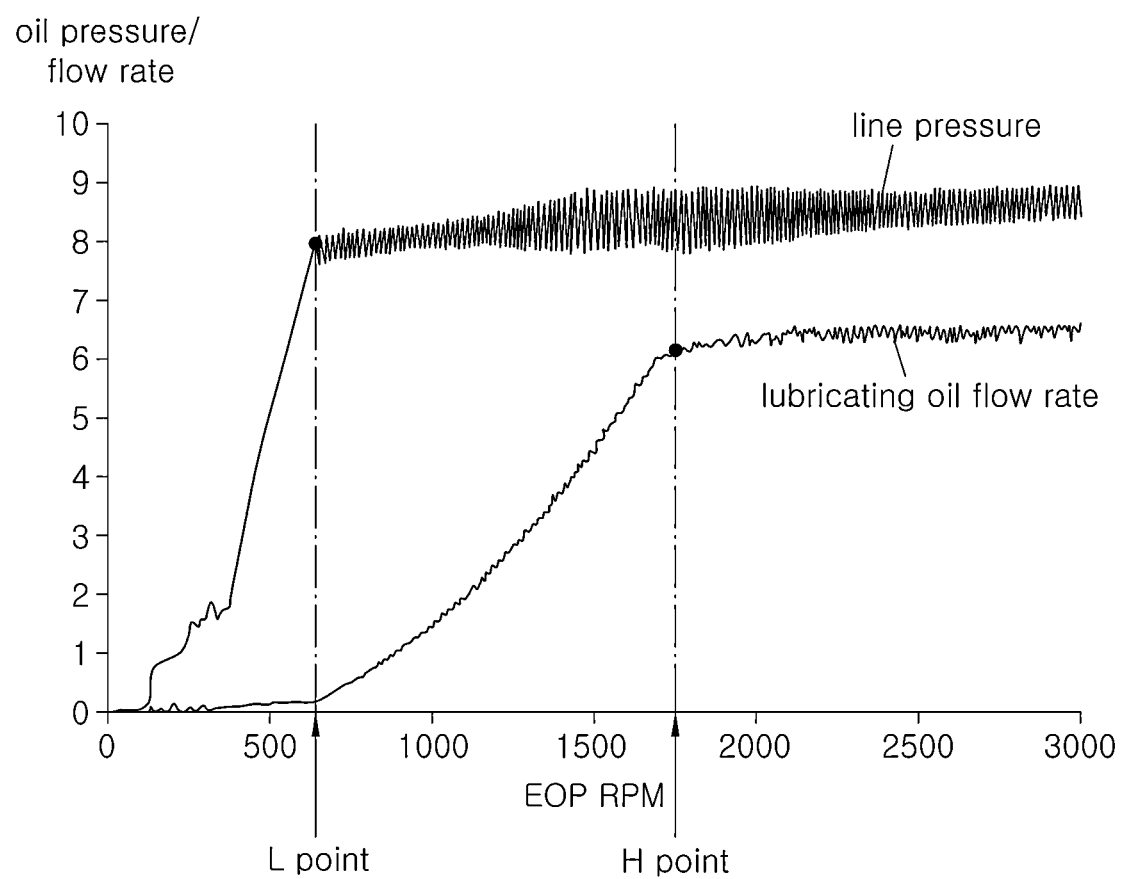
FIG. 4 is a graph representing oil pressure and flow rate supplied to a transmission according to the RPM of the EOP when forming a specific line pressure at a specific ATF temperature.

The high-speed map may be generated using graphs as shown in FIG. 4.

FIG. 4 is a graph representing oil pressure and flow rate supplied to a transmission according to the RPM of the EOP when forming a specific line pressure at a specific ATF temperature. As the RPM of the EOP increases, the oil pressure first reaches the above specific line pressure and the oil pressure remains almost the same thereafter, and there is a section in which the flow rate gradually rises, and in a preceding section, the flow rate is maintained at an almost constant level.

The reason is that when the target line pressure is set depending on the input torque input to the transmission, the line pressure is controlled to be the target line pressure by control of a regulator valve or the like of an oil pressure circuit.

The specific line pressure of FIG. 4 is eventually equivalent to the target line pressure when the transmission is in the same conditions, so that it is construed as a target line pressure hereinafter.

Here, the H-point RPM is set as the RPM at a point where the flow rate starts to be maintained constant after the end portion of the section in which the flow rate gradually rises.

That is, since the flow rate gradually increases as the RPM of the EOP increases and remains almost constant when the flow rate reaches a level which may be regarded as a maximum value as shown, the minimum RPM of the EOP that starts to form the maximum value of the flow rate is selected as the H-point RPM in the present way, and the high-speed mode control is performed based on the H-point RPM, to enable the EOP to be driven at the minimum RPM to be able to obtain the maximum flow rate in the current target line pressure situation, preventing unnecessary increase in the RPM of EOP.

Accordingly, the above "minimum RPM of the EOP that forms the maximum value of the flow rate generated when forming the corresponding line pressure" does not mean the minimum RPM of the EOP that forms the maximum value in a practically absolute sense, but means the RPM of the EOP at a time when the flow rate rises and starts to converging into a certain range, as in a graph shown in FIG. 4.

The high-speed map may be generated based on a plurality of graphs formed as shown in FIG. 4 for a plurality of ATF temperature and a plurality of target line pressure, which are required for the control of a transmission.

Meanwhile, the low-speed mode is a mode for driving the EOP by use of the L-point RPM selected depending on the current target line pressure and ATF temperature from the low-speed map including the L-point RPM according to the line pressure and the ATF temperature.

The L-point RPM includes the minimum RPM of the EOP that forms the corresponding line pressure for the combinations of each of line pressure and ATF temperature.

Figure 5:
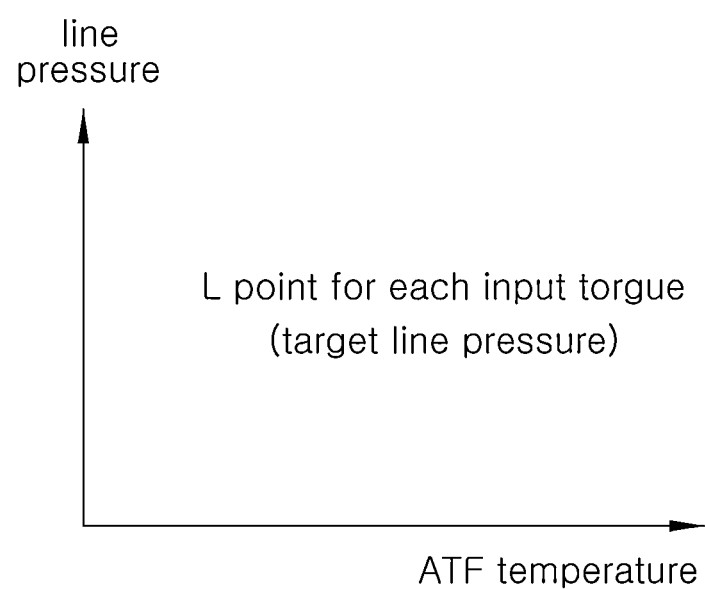
FIG. 5 is a conceptual view showing a low-speed map according to various exemplary embodiments of the present invention.

FIG. 5 is a conceptual view showing a low-speed map, which includes the L-point RPM according to the line pressure and ATF temperature, so that the controller may easily select the L-point RPM corresponding to the current target line pressure and ATF temperature.

In the graph as shown in FIG. 4, the L-point RPM indicates the RPM of the EOP when the oil pressure reaches the target line pressure as the RPM of the EOP increases.

In other words, the L-point RPM means the minimum RPM of the EOP to form the corresponding target line pressure.

Since the low-speed map may also be generated based on the plurality of graphs formed as shown in FIG. 4 for the plurality of target line pressure and the plurality of ATF temperature, which are required for the control of the transmission, the L-point RPM and the H-point RPM may be obtained together in a single graph as shown in FIG. 4, and the M-point RPM, which will be described later, may also be obtained.

The middle-speed mode is a mode for driving the EOP by use of the M-point RPM selected depending on the current target line pressure and ATF temperature from the middle-speed map including the M-point RPM according to the line pressure and the ATF temperature.

Among the RPM provided between the L-point RPM which is the minimum RPM of the EOP forming the corresponding line pressure for the combinations of each of the line pressure and ATF temperature and the H-point RPM which is the minimum RPM of the EOP providing the maximum value of the flow rate generated when forming the corresponding line pressure, the M-point RPM is determined such that the higher the line pressure, the closer the H-point RPM, and also is determined such that the lower the line pressure, the closer the L-point RPM.

The M-point RPM is determined as the RPM between the L-point RPM and the H-point RPM in the graph representing the specific line pressure which is realized as shown in FIG. 4, and is determined according to the height of the specific line pressure among the RPM in the present range.

That is, for example, the M-point RPM may be the RPM determined by equally applying a % ratio of the current target line pressure for the maximum line pressure of the transmission to a section between the L-point RPM and the H-point RPM.

Figure 6:
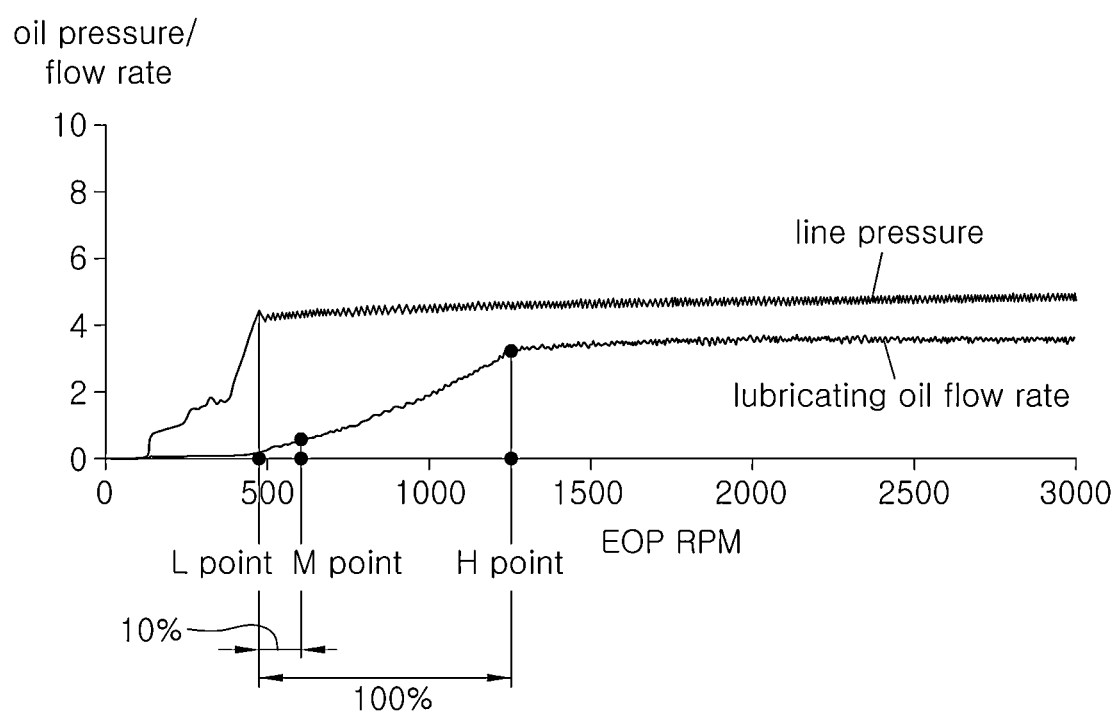
FIG. 6, FIG. 7, and FIG. 8 are graphs showing comparison of determining the M-point RPM according to target line pressure.
Figure 7:
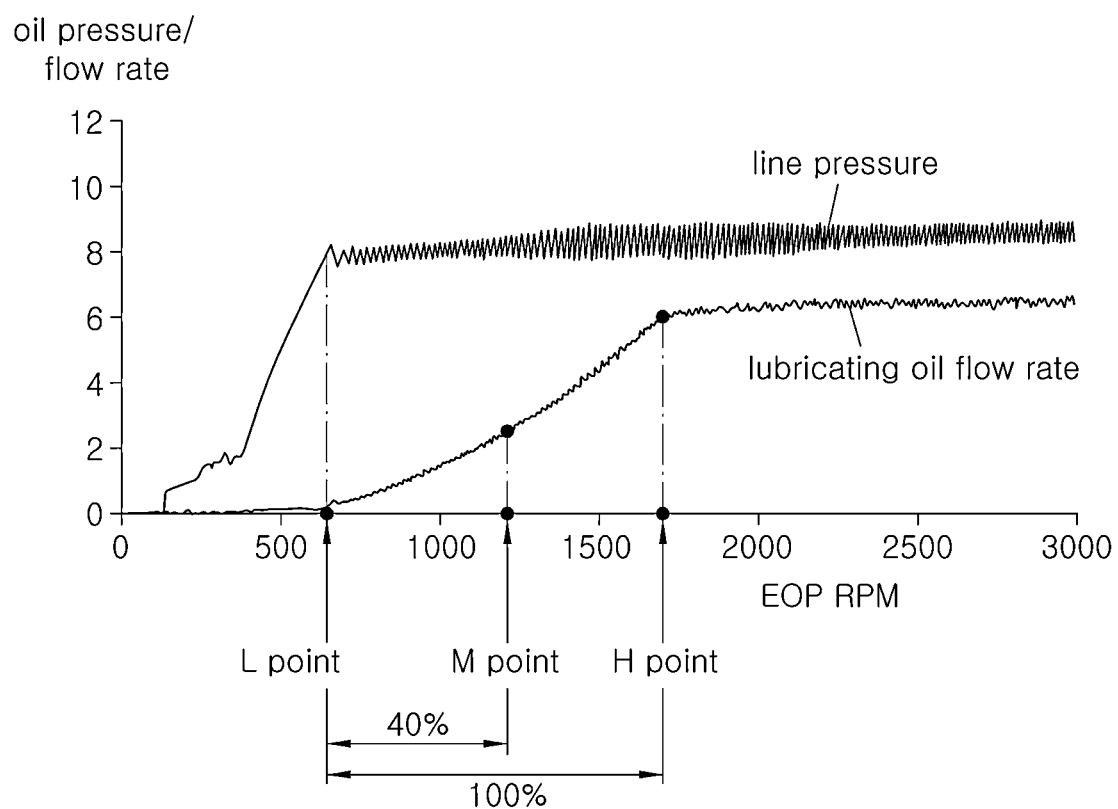
Figure 8:
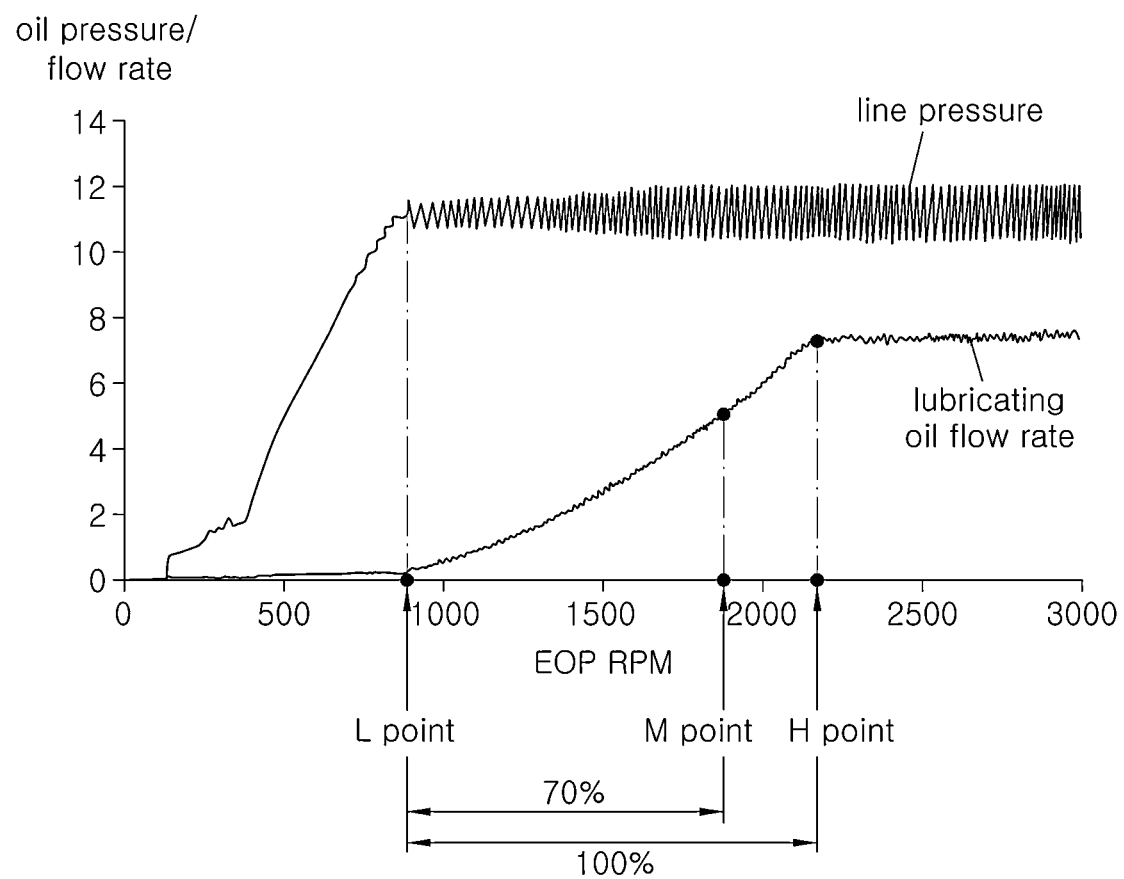

FIG. 6, FIG. 7, and FIG. 8 are views each showing determination of the M-point RPM as described above by comparing the determination with each other. FIG. 6 shows that when the target line pressure is 10% of the maximum line pressure of the transmission, the M-point RPM is determined as the RPM at a point positioned at 10% of a section interval between the RPM at the point L and the RPM at the point H in FIG. 6. FIG. 7 shows that when the target line pressure is 40% of the maximum line pressure of the transmission, the M-point RPM is determined as the RPM at a point positioned at 40% of the section interval between the RPM at the point L and the RPM at the point H in FIG. 7. FIG. 8 shows that when the target line pressure is 70% of the maximum line pressure of the transmission, the M-point RPM is determined as the RPM at a point positioned at 70% of the section interval between the RPM at the point L and the RPM at the point H in FIG. 8.

Figure 9:
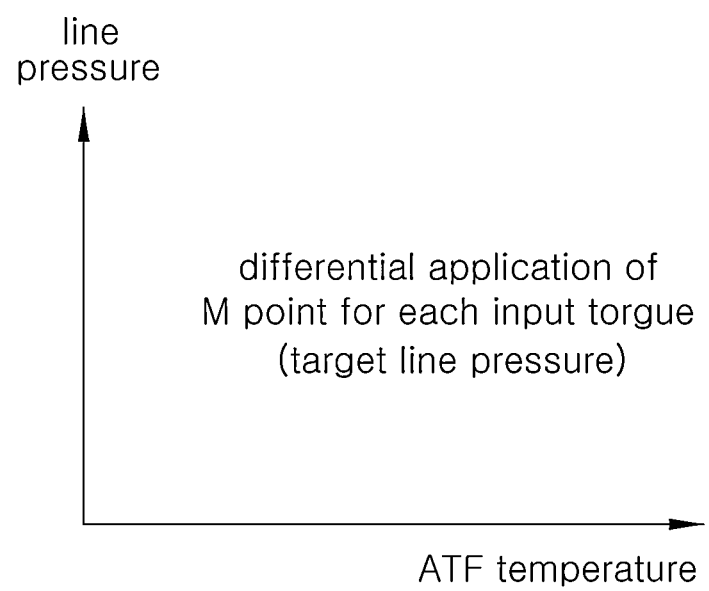
FIG. 9 is a conceptual view showing a middle-speed map according to various exemplary embodiments of the present invention.

That is, as described above, since the L-point RPM, the M-point RPM, and the H-point RPM may be obtained from such a graph shown in FIG. 4, the L-point RPM, the M-point RPM, and the H-point RPM as described above are obtained and used for the plurality of ATF temperature and line pressure, so that the high-speed map in FIG. 3, the low-speed map in FIG. 5, and the middle-speed map in FIG. 9 are realized.

The target line pressure is determined according to the input torque of the transmission. For example, the target pressure may be set to be simply proportional to the input torque.

Meanwhile, in the case of controlling the EOP in the high-speed mode by starting a vehicle, the target line pressure may be controlled to be the minimum line pressure.

That is, since the minimum line pressure means the minimum oil pressure at which the transmission may operate at the corresponding ATF temperature, when the target line pressure is set to the minimum line pressure in the high-speed mode, the EOP is driven at the minimum RPM that allows the flow rate to reach the maximum value while generating the minimum oil pressure for the transmission to operate, so that the flow path is rapidly filled at the maximum value of the flow rate while the RPM of the EOP is driven as low as possible, minimizing the EOP driving time and contributing to fuel economy improvement by minimizing the energy loss caused by the EOP driving.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an electric oil pump (EOP) of a vehicle, the method comprising:
controlling, by a controller electrically connected to the EOP, the EOP in a predetermined high-speed mode when the vehicle is started;
controlling, by the controller, the EOP in a predetermined middle-speed mode in which the EOP is driven at a revolutions per minute (RPM) lower than an RPM of the predetermined high-speed mode when the predetermined high-speed mode is terminated; and
controlling, by the controller, the EOP in a predetermined low-speed mode in which the EOP is driven at an RPM lower than the RPM of the predetermined middle-speed mode when the vehicle is stopped,
wherein in the predetermined high-speed mode, the predetermined middle-speed mode and the predetermined low-speed mode, the controller is configured to commonly control the RPMs of the EOP in consideration of a target line pressure and an automatic transmission fluid (ATF) temperature of a transmission to which the EOP is configured to supply oil pressure.

2. The method of claim 1, wherein the EOP is controlled in the predetermined high-speed mode, when the vehicle starts while being controlled in the predetermined low-speed mode.

3. The method of claim 1, wherein the predetermined high-speed mode is terminated after being performed for a predetermined reference time.

4. The method of claim 1, wherein, in the predetermined high-speed mode, the EOP is driven by use of a H-point RPM selected depending on current target line pressure and the ATF temperature from a high-speed map including the H-point RPM according to line pressure and the ATF temperature, and
the H-point RPM includes a minimum RPM of the EOP providing a maximum value of a flow rate generated when forming corresponding line pressure for combinations of each of the line pressure and the ATF temperature.

5. The method of claim 4, wherein, in a case of controlling the EOP in the predetermined high-speed mode by starting the vehicle, the target line pressure is controlled to be a minimum line pressure.

6. The method of claim 1, wherein, in the predetermined low-speed mode, the EOP is driven by use of a L-point RPM selected depending on current target line pressure and the ATF temperature from a low-speed map including the L-point RPM according to line pressure and the ATF temperature, and
the L-point RPM includes a minimum RPM of the EOP providing corresponding line pressure for combinations of each of the line pressure and the ATF temperature.

7. The method of claim 1, wherein, in the predetermined middle-speed mode, the EOP is driven by use of a M-point RPM selected depending on current target line pressure and the ATF temperature from a middle-speed map including the M-point RPM according to line pressure and the ATF temperature, and
among RPM from a L-point RPM which is a minimum RPM of the EOP for forming corresponding line pressure for combinations of each of the line pressure and the ATF temperature to H-point RPM which is a minimum RPM of the EOP for providing a maximum value of a flow rate generated when forming the corresponding line pressure, the M-point RPM is determined such that the higher the line pressure, the closer the H-point RPM, and also is determined such that the lower the line pressure, the closer the L-point RPM.

8. The method of claim 7, wherein the M-point RPM is RPM determined by equally applying a % ratio of the current target line pressure to a maximum line pressure of the transmission to a section between the L-point RPM and the H-point RPM.

9. The method of claim 1, wherein the target line pressure is determined by an input torque of the transmission.

10. A non-transitory computer readable storage medium on which a program for performing the method of claim 1 is recorded.

11. A vehicle comprising:
a transmission;
an electric oil pump (EOP) to supply oil pressure required for the transmission; and
a controller electrically connected to the EOP and configured for:
controlling the EOP in a predetermined high-speed mode when the vehicle is started;
controlling the EOP in a predetermined middle-speed mode in which the EOP is driven at a revolutions per minute (RPM) lower than an RPM of the predetermined high-speed mode when the predetermined high-speed mode is terminated; and
controlling the EOP in a predetermined low-speed mode in which the EOP is driven at an RPM lower than the RPM of the predetermined middle-speed mode when the vehicle is stopped,
wherein in the predetermined high-speed mode, the predetermined middle-speed mode and the predetermined low-speed mode, the controller is configured to commonly control the RPMs of the EOP in consideration of a target line pressure and an automatic transmission fluid (ATF) temperature of the transmission.

12. The vehicle of claim 11, wherein the EOP is controlled in the predetermined high-speed mode, when the vehicle starts while being controlled in the predetermined low-speed mode.

13. The vehicle of claim 11, wherein the predetermined high-speed mode is terminated after being performed for a predetermined reference time.

14. The vehicle of claim 11, wherein, in the predetermined high-speed mode, the EOP is driven by use of a H-point RPM selected depending on current target line pressure and the ATF temperature from a high-speed map including the H-point RPM according to line pressure and the ATF temperature, and
the H-point RPM includes a minimum RPM of the EOP providing a maximum value of a flow rate generated when forming corresponding line pressure for combinations of each of the line pressure and the ATF temperature.

15. The vehicle of claim 14, wherein, in a case of controlling the EOP in the predetermined high-speed mode by starting the vehicle, the target line pressure is controlled to be a minimum line pressure.

16. The vehicle of claim 11, wherein, in the predetermined low-speed mode, the EOP is driven by use of a L-point RPM selected depending on current target line pressure and the ATF temperature from a low-speed map including the L-point RPM according to line pressure and the ATF temperature, and the L-point RPM includes a minimum RPM of the EOP providing corresponding line pressure for combinations of each of the line pressure and the ATF temperature.

17. The vehicle of claim 11, wherein, in the predetermined middle-speed mode, the EOP is driven by use of a M-point RPM selected depending on current target line pressure and the ATF temperature from a middle-speed map including the M-point RPM according to line pressure and the ATF temperature, and among RPM from the L-point RPM which is a minimum RPM of the EOP for forming corresponding line pressure for combinations of each of the line pressure and the ATF temperature to H-point RPM which is a minimum RPM of the EOP for providing a maximum value of a flow rate generated when forming the corresponding line pressure, the M-point RPM is determined such that the higher the line pressure, the closer the H-point RPM, and also is determined such that the lower the line pressure, the closer the L-point RPM.

18. The vehicle of claim 17, wherein the M-point RPM is RPM determined by equally applying a % ratio of the current target line pressure to a maximum line pressure of the transmission to a section between the L-point RPM and the H-point RPM.

19. The vehicle of claim 11, wherein the target line pressure is determined by an input torque of the transmission.

* * * * *